United States Patent
Yoshida et al.

(10) Patent No.: US 7,520,557 B2
(45) Date of Patent: Apr. 21, 2009

(54) SIDE STRUCTURE OF VEHICLE

(75) Inventors: Motoki Yoshida, Fuchu-cho (JP);
Takashi Niseki, Fuchu-cho (JP);
Kazuya Fukutani, Fuchu-cho (JP);
Katsuhito Kouno, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 678 days.

(21) Appl. No.: 11/157,807

(22) Filed: Jun. 22, 2005

(65) Prior Publication Data
US 2006/0000145 A1 Jan. 5, 2006

(30) Foreign Application Priority Data
Jul. 2, 2004 (JP) .............................. 2004-197328

(51) Int. Cl.
*B60J 5/06* (2006.01)
*B60R 21/02* (2006.01)

(52) U.S. Cl. ................ 296/155; 296/146.6; 296/187.12

(58) Field of Classification Search .............. 296/146.6, 296/155, 187.12, 193.06, 193.05, 203.03, 296/146.9
See application file for complete search history.

(56) References Cited

U.S. PATENT DOCUMENTS

| | | | | |
|---|---|---|---|---|
| 3,312,015 A * | 4/1967 | Edourad | ....................... | 49/213 |
| 4,152,872 A | 5/1979 | Tanizaki et al. | | |
| 4,413,444 A | 11/1983 | Chikaraishi | | |
| 4,433,507 A * | 2/1984 | Chikaraishi | ................... | 49/213 |
| 4,561,690 A * | 12/1985 | Shinjo et al. | ................. | 296/155 |
| 4,582,357 A * | 4/1986 | Nakamura et al. | ..... | 296/203.03 |
| 5,140,316 A * | 8/1992 | DeLand et al. | ......... | 340/825.69 |
| 5,896,704 A * | 4/1999 | Neag et al. | ..................... | 49/209 |
| 6,328,374 B1 * | 12/2001 | Patel | .......................... | 296/155 |
| 7,390,054 B2 * | 6/2008 | Suzuki | ....................... | 296/155 |
| 2002/0036415 A1 | 3/2002 | Kleemann | | |

FOREIGN PATENT DOCUMENTS

DE 198 24 404 A 1 5/1998
JP 06-74436 10/1994

OTHER PUBLICATIONS

European Search Report Dated Oct. 7, 2005 Application No. EP 05 01 3839.

* cited by examiner

*Primary Examiner*—Glenn Dayoan
*Assistant Examiner*—Gregory Blankenship
(74) *Attorney, Agent, or Firm*—Studebaker & Brackett PC; Donald R. Studebaker

(57) ABSTRACT

A pin having an enlarged head is fixed to a lower end portion of a sliding rear side door. The pin is disposed at a point corresponding to a door slide opening formed in a side sill, and the enlarged head of the pin is goes into a box member incorporated in the side sill through the door slide opening when the sliding rear side door is closed. A lower rail having a downward-opening U-shaped cross section is welded to a top plate portion of the box member. A lower roller unit fixed to the sliding rear side door fits into the lower rail, whereby the lower rail guides the sliding rear side door during opening and closing operation thereof. A vertical wall portion of the box member is welded to a first reinforcement member which passes generally vertically through the side sill.

7 Claims, 6 Drawing Sheets

SIDE STRUCTURE OF VEHICLE

BACKGROUND OF THE INVENTION

1. Field of the Invention

The present invention relates to a side structure of a vehicle. More particularly, the invention pertains to a side structure of a vehicle having a sliding side door for opening and closing a door aperture in a side of the vehicle, the side structure featuring a capability to reduce intrusion of the sliding side door into a passenger compartment in the event of a side impact crash.

2. Description of the Related Art

Japanese Laid-open Utility Model Publication No. 1994-74436 (hereinafter "Suzuki '436 Publication") introduces two different arrangements for reducing intrusion of a sliding side door into the interior of a vehicle caused by side impact crashes. One of these arrangements (first arrangement), shown as an example of a prior art technique, is such that a downward-extending locking pin is provided on a bottom surface of a side door while an upward-projecting retaining part for receiving the locking pin is mounted on top surface of a side sill. The other arrangement (second arrangement) disclosed in the Publication is such that a hook-shaped engaging member projecting inward in a lateral direction of the vehicle is fixed to a lower end portion of an inner panel of a side door while a hole for receiving the hook-shaped engaging member is formed in a side surface of a side sill.

Suzuki '436 Publication argues that the first arrangement works effectively in a case where the amount of overlap between a lower end portion of the side door and the side sill is small, or if a lower end of the side door is located at about the middle of the height of the side sill. On the other hand, the Publication states that the second arrangement is effective in a case where the amount of overlap between the lower end portion of the side door and the side sill is large, or if the lower end portion of the side door is shaped to cover the side surface of a side sill.

The side sill is a mechanical element exposed to the exterior of the vehicle when the side door is opened. For this reason, the provision of the retaining part or the hole in the side sill shown in Suzuki '436 Publication is not preferable from the viewpoint of external appearance. As illustrated in the drawings appended to the Publication, the side sill is made up of the aforementioned inner panel and an outer panel. The side sill thus structured must have sufficient stiffness to reduce intrusion of the side door into the vehicle interior in side impact crashes. It is therefore essential to carefully study a side sill reinforcement structure if either of the arrangements shown in Suzuki '436 Publication is to be embodied in a side structure of a vehicle. In addition, this approach is likely to result in increases in the number of components and manufacturing cost.

SUMMARY OF THE INVENTION

Accordingly, it is an object of the invention to provide a side structure of a vehicle which makes it possible to reduce intrusion of a side door into a passenger compartment potentially caused by a side impact crash without jeopardizing the external appearance of a vehicle body.

It is another object of the invention to provide a side structure of a vehicle which makes it possible to reduce intrusion of a side door into a passenger compartment potentially caused by a side impact crash by using a conventional vehicle body structure.

It is still another object of the invention to provide a side structure of a vehicle which makes it possible to effectively reduce intrusion of a side door into a passenger compartment potentially caused by a side impact crash without jeopardizing the external appearance of a vehicle body by decreasing deformation of a side sill due to a side impact.

The present invention has been made through an intensive study of a side structure of a vehicle provided with a sliding side door. Since all vehicles of this kind have a side door slide mechanism incorporated in a side sill, the side sill has a relatively high level of stiffness. Also, the side sill of a vehicle provided with a sliding side door normally incorporates a guide rail member for guiding a lower end portion of the sliding side door, so that a door slide opening directed laterally outward is formed in the side sill. Therefore, it is possible to configure a structure for reducing intrusion of the sliding side door into a passenger compartment in the event of a side impact crash by using the door slide opening without the need to form any hole dedicated exclusively to reducing side door intrusion in the side sill.

Specifically, a side structure of a vehicle of the invention includes a sliding side door for opening and closing a door aperture by sliding along a longitudinal direction of a vehicle body, the sliding side door being provided with a lower roller which is fitted to a lower end portion of the sliding side door in such a way that the lower roller projects laterally toward a passenger compartment, a side sill incorporating a guide rail member for guiding the lower roller along the longitudinal direction of the vehicle body when the sliding side door is slid, the side sill having a door slide opening which is directed laterally outward and extends along the longitudinal direction of the vehicle body, and a engaging member which is fixed to the lower end portion of the sliding side door and extends laterally toward the passenger compartment. In this side structure, the engaging member is located in the door slide opening when the sliding side door is closed, and the engaging member becomes engaged with a peripheral portion of the door slide opening when the sliding side door deforms as a result of a side impact crash.

The aforementioned vehicle side structure of the invention is obtained by using a conventionally known basic structure of a vehicle provided with a sliding side door, in which the side sill has a relatively high level of stiffness by incorporating a guide rail member for guiding the sliding side door when the sliding side door is opened and closed, the side sill having a door slide opening which is directed laterally outward. With the provision of the aforementioned engaging member which becomes engaged with the door slide opening when the sliding side door deforms, it is possible to reduce intrusion of the sliding side door into the passenger compartment in the event of a side impact crash. It is therefore unnecessary to provide the side sill with any dedicated part exposed to the exterior of the vehicle, especially an additional hole in the side sill for receiving the engaging member, for reducing intrusion of the sliding side door into the passenger compartment unlike the case of the aforementioned conventional arrangements.

These and other objects, features and advantages of the invention will become more apparent upon reading the following detailed description along with the accompanying drawings.

DETAILED DESCRIPTION OF THE PREFERRED EMBODIMENTS OF THE INVENTION

Figure 1:
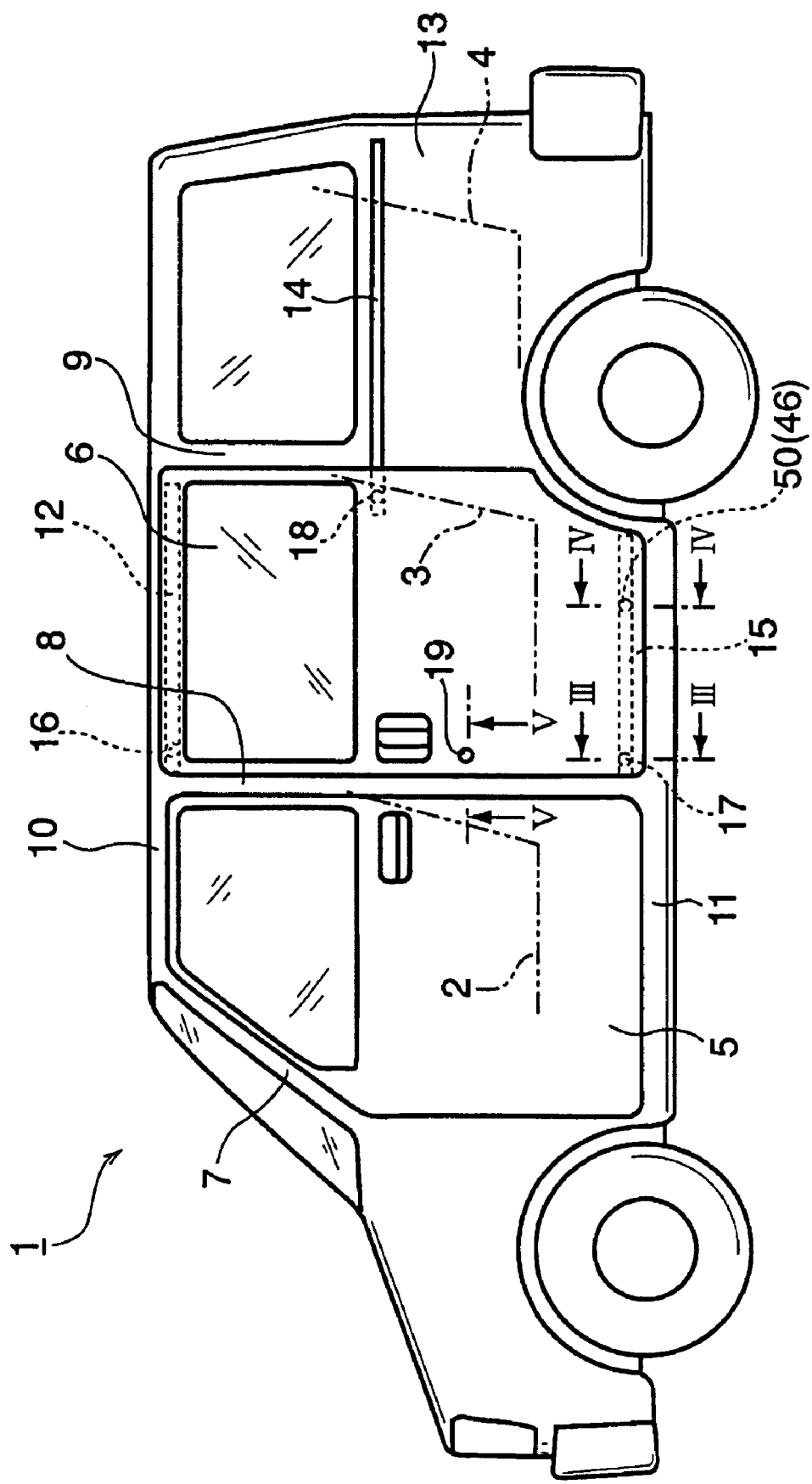
FIG. 1 is a side view of a vehicle according to a specific embodiment of the invention.

FIG. 1 is a side view of a vehicle 1 according to a specific embodiment of the invention. The vehicle 1 shown in FIG. 1 is a so-called minivan provided with three rows of seats 2, 3, 4 arranged in a passenger compartment at intervals. Generally speaking, left and right sides of a vehicle may be symmetrical or asymmetrical. The following discussion deals with a side structure of only one side (left side as illustrated in FIG. 1) of the vehicle 1 for the simplicity of explanation. The vehicle 1 has a front side door 5 at the first-row seat 2 and a rear side door 6 at the second-row seat 3. The front side door 5 is a front-hinged rear-opening swinging door, while the rear side door 6 is a sliding door.

The vehicle 1 has, from front to rear, an A-pillar 7, a B-pillar 8 and a C-pillar 9. Upper ends of these pillars 7, 8, 9 are connected to a roof rail unit 10 which runs generally in a straight line along a longitudinal axis (centerline) of the vehicle 1, while lower ends of the pillars 7, 8, 9 are connected to a side sill 11. Front and rear door apertures are defined by these pillars 7, 8, 9, and the front and rear side doors 5, 6 are mounted in the front and rear door apertures, respectively, in such a fashion that the side doors 5, 6 can be opened and closed.

Specifically, a front end of the front side door 5 is attached to the A-pillar 7 by hinges such that the front door aperture defined by the A-pillar 7 and the B-pillar 8 can be opened and closed.

The rear side door 6 is slidably mounted on the side of the vehicle 1 such that the rear door aperture defined by the B-pillar 8 and the C-pillar 9 can be opened and closed. When the rear side door 6 is slid open, occupants of the second- and third-row seats 3, 4 can get into and get out of the vehicle 1. The sliding rear side door 6 is slidably supported by a vehicle body at an upper end portion, a mid-height portion and a lower end portion of the rear side door 6. Specifically, the upper end portion of the rear side door 6 is supported by an upper guide rail 12 provided in the roof rail unit 10, the mid-height portion of the rear side door 6 is supported by a central guide rail 14 installed in a rear side outer panel 13, and the lower end portion of the rear side door 6 is supported by a lower guide member (rail) 15 disposed in the side sill 11.

To be more specific, roller units 16, 17 are rotatably fitted to upper and lower ends of a front end portion of the rear side door 6, respectively, in such a manner that the roller units 16, 17 project laterally inward. Additionally, a roller unit 18 is rotatably fitted to a rear end of the mid-height portion of the rear side door 6, the roller unit 18 also projecting laterally inward. As these roller units 16, 17, 18 roll within the aforementioned guide rails 12, 14, 15, the rear side door 6 can slide between a closed position located between the B-pillar 8 and the C-pillar 9 and an open position located to the rear of the closed position on the outside of the rear side outer panel 13.

Operation for opening and closing the sliding rear side door 6 is conventional. Specifically, when opening the rear side door 6 from the closed position, a passenger pulls a handle of the rear side door 6 to slightly displace the rear side door 6 laterally outward from the closed position and then slides the rear side door 6 rearward along the side of the vehicle body. This means that the rear side door 6 is structured such that the rear side door 6 can be slid along a longitudinal direction of the vehicle body at least between the open position and a predetermined position in the proximity of the closed position and along a lateral direction of the vehicle 1 between the predetermined position in the proximity of the closed position and the closed position. Thus, when moving the rear side door 6 from the open position to the closed position, the passenger first slides the rear side door 6 frontward from the open position to the proximity of the closed position and then forces the rear side door 6 inward against the vehicle body until the rear side door 6 completely fits into the rear door aperture.

As in a conventional structure, the rear side door 6 has a door lock mechanism (not shown) in a frontal part of the mid-height portion of the rear side door 6 for locking the rear side door 6 to the B-pillar 8. Designated by the reference numeral 19 in FIG. 1 is a keyhole of the door lock mechanism.

Figure 2:
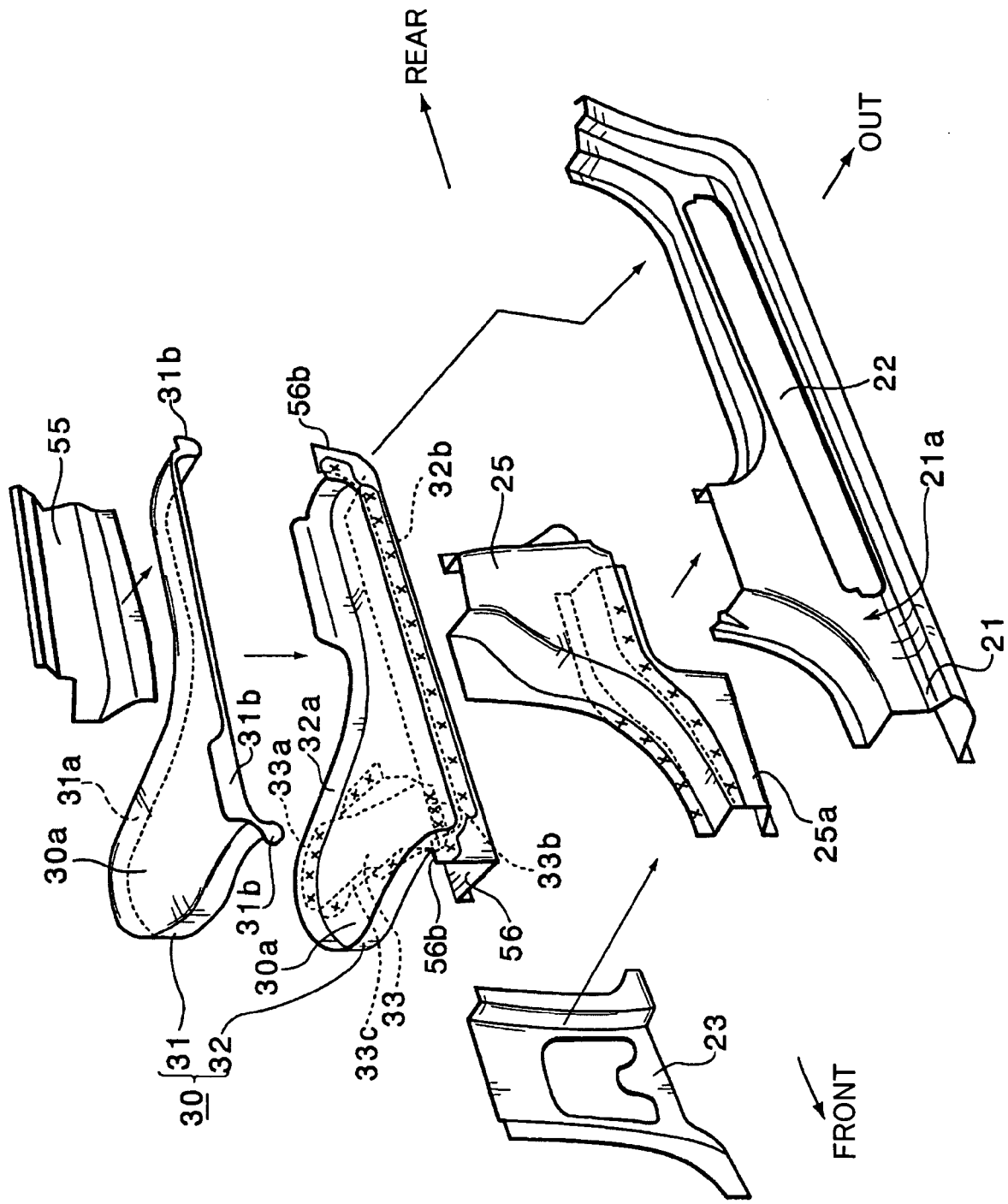
FIG. 2 is an exploded perspective view showing principal components of a side structure the vehicle.
Figure 3:
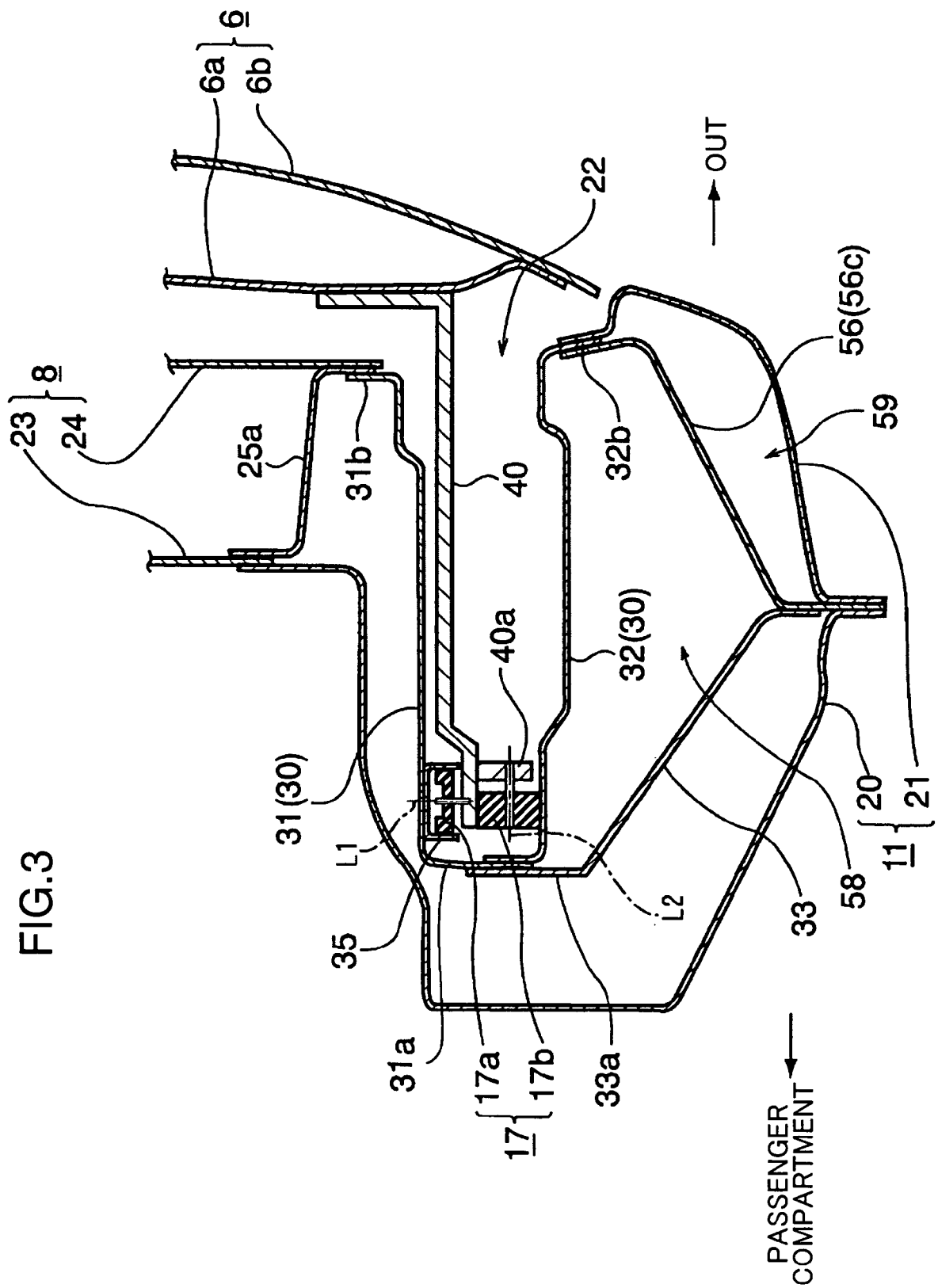
FIG. 3 is a cross-sectional view taken along lines III-III of FIG. 1.
Figure 4:
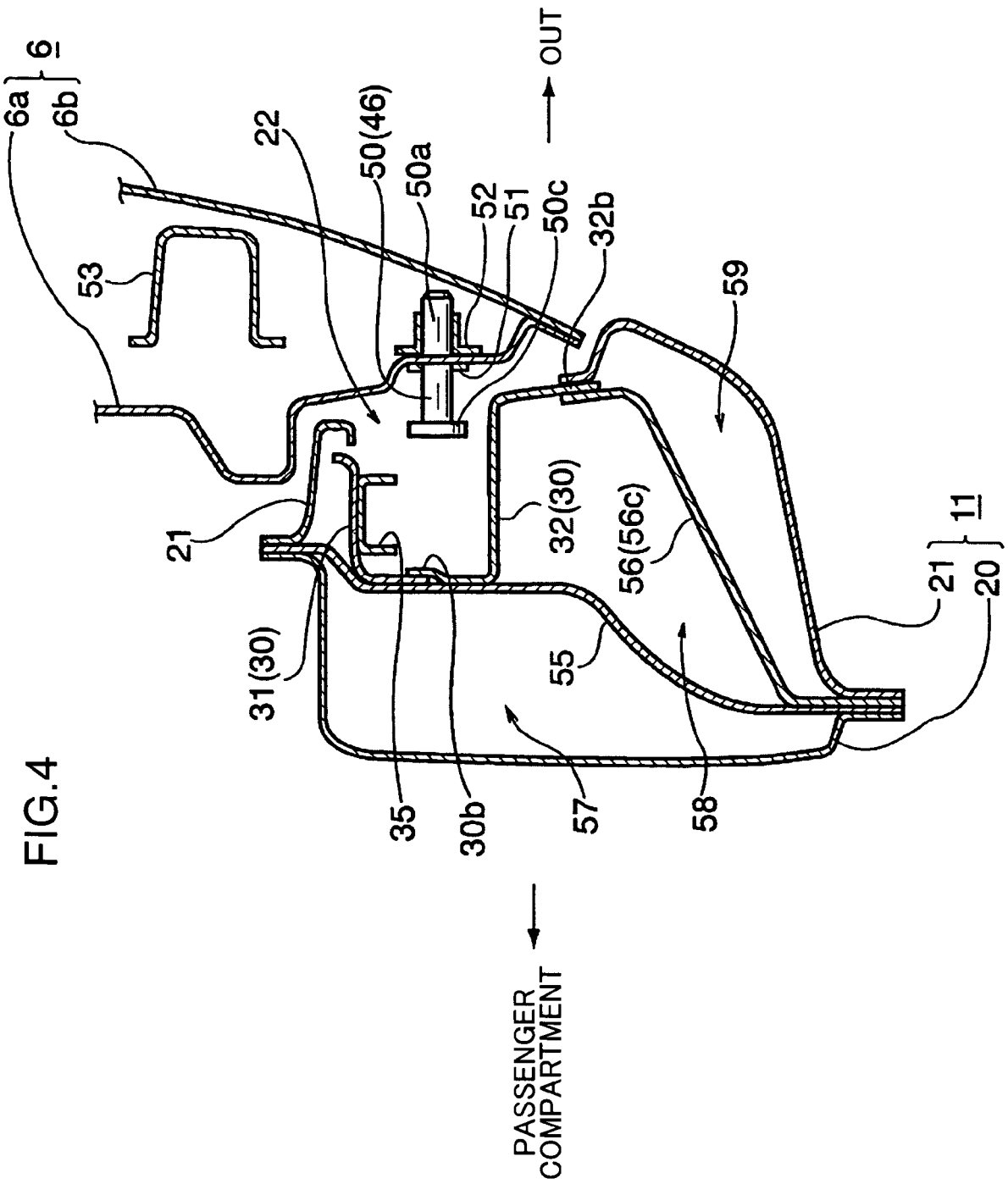
FIG. 4 is a cross-sectional view taken along lines IV-IV of FIG. 1.

FIG. 2 is an exploded perspective view showing the side sill 11 and associated components thereof, FIG. 3 is a cross-sectional view taken along lines III-III of FIG. 1, and FIG. 4 is a cross-sectional view taken along lines IV-IV of FIG. 1.

As in the conventional structure, the side sill 11 has a closed-section structure (box section) formed by a side sill inner plate 20 and a side sill outer plate 21 with upper and lower edges of the side sill inner plate 20 joined to upper and lower edges of the side sill outer plate 21, respectively, as shown in FIGS. 3 and 4. The side sill outer plate 21 has a vertical wall portion 21a (FIG. 2) in which a narrow opening 22 is formed, the opening 22 extending along the longitudinal direction of the vehicle body as far as the distance between the B-pillar 8 and the C-pillar 9. As will be later described in detail, this opening 22 (hereinafter referred to as the door slide opening 22) constitutes a structural part of a door slide mechanism for the rear side door 6.

Designated by the reference numeral 23 in FIG. 2 is an inner pillar plate of the B-pillar 8, and designated by the reference numeral 24 in FIG. 3 is an outer pillar plate of the B-pillar 8. While the B-pillar 8 is of box-section design as in the conventional structure, there is provided a pillar reinforcement 25 at the lower end of the B-pillar 8 where the B-pillar 8 and the side sill 11 are joined to each other in this embodiment. The pillar reinforcement 25 is not simply positioned at the lower end of the B-pillar 8 but a lower front end of the pillar reinforcement 25 extends frontward up to a forward area of the door slide opening 22. This forward-extending portion of the pillar reinforcement 25 constitutes an extended reinforcement part 25a. The extended reinforcement part 25a of the pillar reinforcement 25 forms a closed section within the side sill 11 and thereby serves to increase the stiffness of a region of the side sill 11 immediately at the front of the door slide opening 22. With the provision of the pillar reinforcement 25, there is formed an additional closed-section structure for increasing not only the stiffness of a joint area of the B-pillar 8 and the side sill 11 but also the stiffness of the region of the side sill 11 immediately at the front of the door slide opening 22. In addition, the pillar reinforcement 25 forms an internal wall which passes across the joint area between the B-pillar 8 and the side sill 11 (refer to FIG. 3).

While the pillar reinforcement 25 is made by welding two metal parts in the present embodiment as illustrated in FIG. 2, it is needless to say that the pillar reinforcement 25 may be made of a single part.

Referring again to FIG. 2, a flat-shaped box member 30 having an open end oriented in one direction toward the door slide opening 22 is welded to the side sill outer plate 21 on an inside surface thereof. More specifically, an outer flangelike portion of the box member 30 surrounding the open end thereof is welded to an inner peripheral area of the door slide opening 22 in the side sill outer plate 21 with the open end of the box member 30 facing the door slide opening 22. Thus, the box member 30 opens on the side of the vehicle body to the exterior through the door slide opening 22. The box member 30 is made of two separate members, that is, the box member 30 is formed by joining an upper box member 31 and a lower box member 32 as illustrated.

A portion of the box member 30 extending inward in the lateral direction of the vehicle 1 constitutes part of the aforementioned lower guide member 15. This portion of the box member 30 is in a forward area thereof, forming an inward-projecting frontal part 30a which enables the opening and closing the sliding rear side door 6 by allowing the rear side door 6 to be slid rearward after the rear side door 6 is first displaced outward from the closed position. As depicted in FIG. 2, a gusset 33 having an upward-opening U-shaped cross section is joined to a portion of the lower box member 32 corresponding to the inward-projecting frontal part 30a of the box member 30. The gusset 33, intended to reinforce the inward-projecting frontal part 30a of the box member 30, forms a closed section together with the aforementioned portion of the lower box member 32.

As can be seen from FIG. 2, the gusset 33 extends in the lateral direction of the vehicle 1 across a frontal part of the lower box member 32. An inner end 33a of the gusset 33 in the lateral direction of the vehicle 1 is welded to a downward-extending flange 31a of the upper box member 31 (refer to FIG. 3). On the other hand, an outer end 33b of the gusset 33 in the lateral direction of the vehicle 1 is welded to a second reinforcement member 56 (refer to FIG. 3) which will be later described. Further, a middle portion 33c of the gusset 33 located between the inner end 33a and the outer end 33b thereof is welded to the underside of a horizontal bottom plate portion of the lower box member 32 (refer to FIG. 2).

The box member 30 is joined to the side sill 11 by welding at flanges 31b, 32b formed on outside ends of the upper and lower box member 31, 32, respectively. What is noticeable in the structure of this embodiment is that the upper box member 31 is welded to the side sill 11 only at a forward end portion and a rear end portion of the upper box member 31 with respect to the longitudinal direction of the vehicle body. In other words, a specific part of the upper box member 31 including middle and rearward areas thereof along the longitudinal direction of the vehicle body is not welded to the side sill 11.

As will be easily recognized from FIG. 2, the flange 31b of the upper box member 31 is made extremely narrow at the aforementioned specific portion. This unwelded part of the upper box member 31 corresponds generally to a region between the B-pillar 8 and the C-pillar 9, or a portion of the box member 30 to the rear of the inward-projecting frontal part 30a. Thus, it is not necessary to prepare any welding points in an area of the side sill 11 corresponding to the region between the B-pillar 8 and the C-pillar 9 and, as a consequence, the side sill 11 can be designed such that the height of the side sill 11 is smaller in the area corresponding to the region between the B-pillar 8 and the C-pillar 9 than in the conventional structure. Accordingly, the height of the side sill 11 can be reduced without any consideration given to the welding of the upper box member 31 and the side sill 11 in vehicle body design. This allows for a low-profile body design, making it possible to relatively reduce the overall height of the vehicle 1.

A lower rail 35 having a downward-opening U-shaped cross section is welded inside the aforementioned portion of the box member 30 extending inward in the lateral direction of the vehicle 1. More specifically, the lower rail 35 is welded to the underside of a horizontal top plate portion of the upper box member 31 (refer to FIGS. 3 and 4). The lower rail 35, which is an element constituting part of the upper box member 31, extends for a specific distance along the longitudinal direction of the vehicle body.

FIG. 3 shows a state in which the rear door aperture is closed by the rear side door 6. Designated by the reference numeral 40 in FIG. 3 is an arm extending in the lateral direction of the vehicle 1. An outer end of the arm 40 is welded to a lower end portion of an inner panel 6a of the rear side door 6. On the other hand, a branching arm element 40a is welded to an inner end portion of the arm 40, the branching arm element 40a extending downward from the arm 40.

Fitted to the inner end portion of the arm 40 and to a lower end portion of the branching arm element 40a are a first roller 17a and a second roller 17b, respectively, which together constitute the aforementioned roller unit 17.

Referring to FIG. 3, the first roller 17a disposed at the inner end portion of the arm 40 is made rotatable about a vertical axis L1, whereas the second roller 17b disposed at the lower end portion of the branching arm element 40a is made rotatable about a horizontal axis L2. The first roller 17a (which is a horizontal roller) located above the inner end portion of the arm 40 is accommodated in the aforementioned lower rail 35 having the downward-opening U-shaped cross section so that the first roller 17a rotates, guided by both side walls of the lower rail 35. On the other hand, the second roller 17b (which is a vertical roller) rotates, guided along the horizontal bottom plate portion of the lower box member 32.

Referring to FIG. 1, there is provided a first door intrusion reducer 45 (refer to FIG. 5) in the side structure of the vehicle 1 for reducing intrusion of the rear side door 6 into the passenger compartment due to a side impact. The first door intrusion reducer 45 is located in an area of the side structure corresponding to the door lock keyhole 19 in the rear side door 6. There is further provided a second door intrusion reducer 46 at a location in the lower end portion of the rear side door 6 slightly to the rear of a mid-length point of the rear side door 6.

Figure 5:
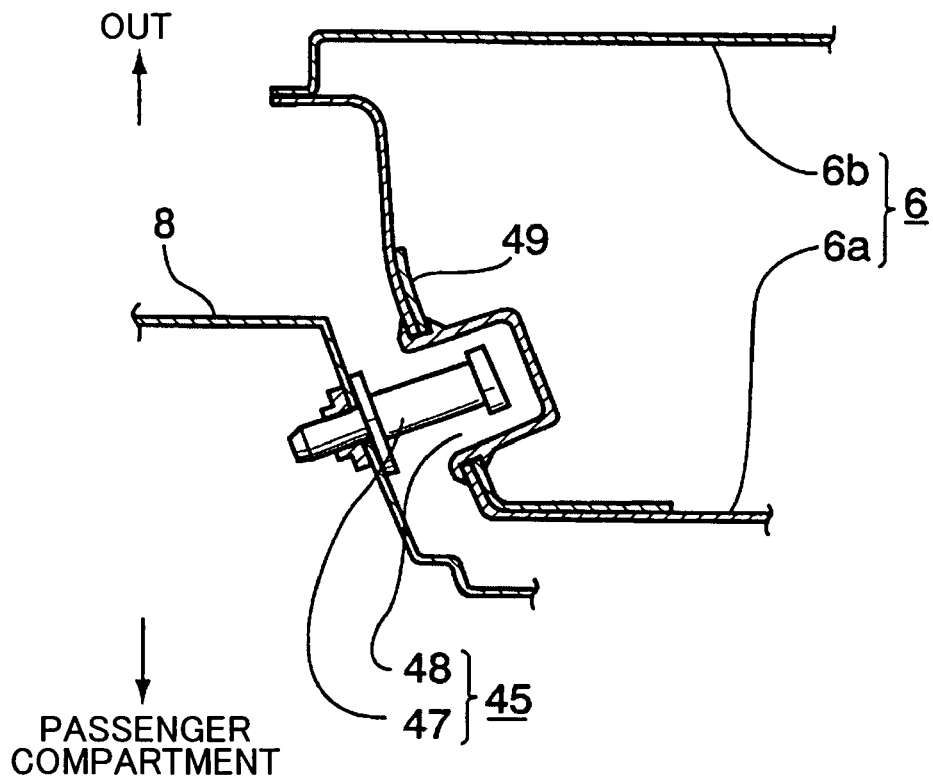
FIG. 5 is a cross-sectional view taken along lines V-V of FIG. 1.

The construction of the aforementioned first door intrusion reducer 45 is conventional so that the first door intrusion reducer 45 is briefly described below. As shown in FIG. 5, the first door intrusion reducer 45 includes a pin 47 which is a engaging member fixed to the B-pillar 8 by a nut and a mating hole 48 formed in the rear side door 6 for receiving the pin 47. The pin 47 is an example of a "second engaging member" mentioned in the appended claims. A reinforcement member 49 is fitted around the mating hole 48 to strengthen a surrounding area thereof.

The second door intrusion reducer 46 is described with reference to FIG. 4. The second door intrusion reducer 46 includes a second pin 50 which is a engaging member fixed to the lower end portion of the rear side door 6 by a nut and the aforementioned door slide opening 22 into which the second pin 50 fits when the rear side door 6 is at the closed position. The second pin 50 is an example of a "engaging member" mentioned in the appended claims. In this embodiment, the second door intrusion reducer 46 includes as an essential part thereof the door slide opening 22 which constitutes a structural part of the door slide mechanism for the rear side door 6.

More specifically, the second pin 50 is disposed slightly to the rear of the mid-length point of the rear side door 6 and extends horizontally inward in the lateral direction of the vehicle 1.

Figure 6:
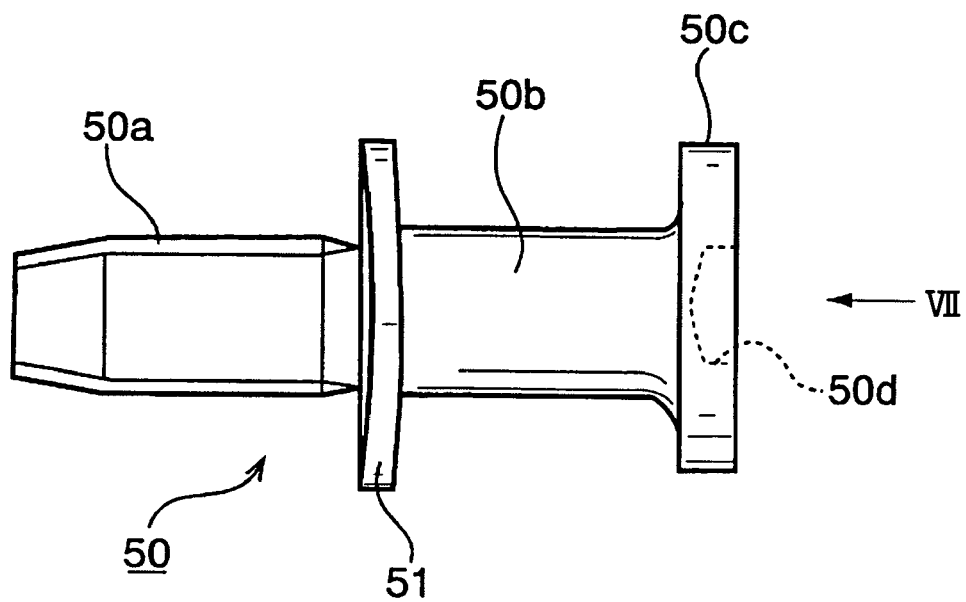
FIG. 6 is a side view of a second pin disposed at a lower end portion of a rear side door of the vehicle.
Figure 7:
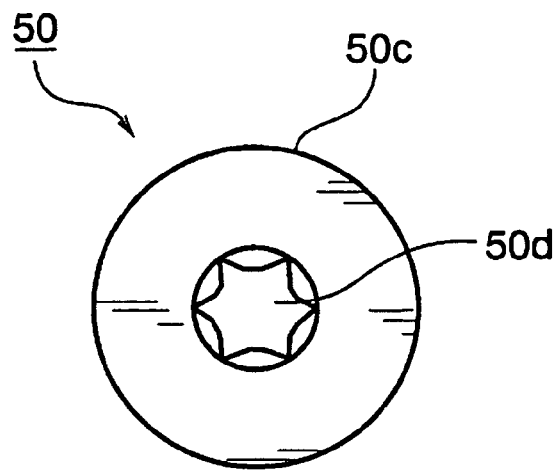
FIG. 7 is a front view of the second pin as seen in the direction of an arrow VII of FIG. 6.

FIG. 6 is a side view of the second pin 50, and FIG. 7 is a front view of the second pin 50 as seen in the direction of an arrow VII of FIG. 6.

The second pin 50 has a threaded portion 50a at one end, a shaft 50b extending from the threaded portion 50a toward the other end of the second pin 50 and an enlarged head 50c, which is radially spread at an extreme end of the shaft 50b. In a central part of the enlarged head 50c, there is formed an odd-shaped hole 50d which accepts an unillustrated tool (screwdriver). Designate by the reference numeral 51 in FIG. 6 is a spring washer.

The second pin 50 is screwed into a welded nut 52 fixed to the inner panel 6a of the rear side door 6 at a position slightly above welded edges of the inner panel 6a and an outer panel 6b of the rear side door 6 at the lower end thereof.

The position of the second pin 50 corresponds to an area where the door slide opening 22 is formed in the side sill 11. Therefore, when the rear side door 6 is closed, the second door intrusion reducer 46 is set in a state in which the enlarged head 50c of the second pin 50 has gone into the box member 30 through the door slide opening 22 as depicted in FIG. 4. In other words, the second pin 50 is located in the door slide opening 22 when the rear side door 6 is closed.

With this arrangement, the second pin 50 can form the second door intrusion reducer 46 together with the door slide opening 22 formed in the side sill 11, which constitutes part of vehicle body strengthening members. In particular, the aforementioned lower rail 35 having the downward-opening U-shaped cross section fixed to the horizontal top plate portion of the upper box member 31 of the box member 30 works as a strengthening member when the enlarged head 50c of the second pin 50 becomes engaged with a specific part of the side sill 11 located along an upper peripheral portion of the door slide opening 22 as a result of a side impact crash.

Generally, a vehicle provided with a rear side door employs a structure in which the stiffness of side sills is increased. Since the stiffness of the side sill 11 is increased in the present embodiment as well by assembling the box member 30 constituting part of the door slide mechanism with the side sill 11, for example, it is possible to reduce intrusion of the rear side door 6 into the passenger compartment due to a side impact by simply using the door slide opening 22 formed in the side sill 11 in combination with the second pin 50 fixed to the lower end portion of the rear side door 6. Especially because the lower rail 35 works as a strengthening member when the second pin 50 becomes engaged with the door slide opening 22, the side structure of the embodiment can exert a sufficient effect of reducing intrusion of the rear side door 6 into the passenger compartment in side impact crashes. In addition, the second pin 50 having the enlarged head 50c securely engages with the door slide opening 22 in the event of a side impact crash, thereby contributing to enhancing the aforementioned door intrusion reducing effect.

While the door slide opening 22 formed in the side sill 11 is exposed to the exterior and can be seen from outside, the provision of this kind of opening is common to vehicles provided with a sliding door. Thus, although the vehicle 1 of the embodiment has basically the same external appearance as the vehicles employing an ordinary (conventional) sliding door, the vehicle 1 of the embodiment can reduce intrusion of the rear side door 6 into the passenger compartment due to a side impact only with the provision of the second pin 50 on the rear side door 6 in the area corresponding to the door slide opening 22 formed in the side sill 11. Referring again to FIG. 4, designated by the reference numeral 53 is an impact bar.

To further enhance the aforementioned door intrusion reducing effect by reducing deformation of the side sill 11 caused by a side impact, the vehicle 1 of the embodiment preferably employs an additional reinforcement structure which is described in the following.

At a portion of the side structure shown in the cross-sectional view of FIG. 4 taken along lines IV-IV of FIG. 1, or at a portion of the side structure where the second door intrusion reducer 46 is located, there is provided a first reinforcement member 55 passing generally vertically through the side sill 11. Further, there is provided the aforementioned second reinforcement member 56 which extends from a lower end of the side sill 11 to a lower end of the box member 30. As is recognized from FIG. 4, there are formed first to third closed sections 57, 58, 59 in an area where the second pin 50 of the second door intrusion reducer 46 goes into the side sill 11 (box member 30) when the rear side door 6 is closed.

More specifically, the first reinforcement member 55 is welded to the side sill inner plate 20 and the side sill outer plate 21 with an upper edge of the first reinforcement member 55 sandwiched between the upper edges of the side sill inner plate 20 and the side sill outer plate 21, and with a lower edge of the first reinforcement member 55 sandwiched between the lower edges of the side sill inner plate 20 and the side sill outer plate 21, as illustrated in FIG. 4. On the other hand, the second reinforcement member 56 is welded along upper and lower edges thereof with the upper edge of the second reinforcement member 56 overlaid on the flange 32b of the lower box member 32 and another upper edge of the side sill outer plate 21, that is, a substantial lower edge of the door slide opening 22, and with the lower edge of the second reinforcement member 56 sandwiched between the lower edges of the side sill inner plate 20 and the side sill outer plate 21.

Preferably, the first reinforcement member 55 passing generally vertically through the side sill 11 is shaped such that the first reinforcement member 55 extends along a vertical wall portion 30b of the box member 30 located at a laterally inward part of the box member 30 and the first reinforcement member 55 is welded to this vertical wall portion 30b. The first reinforcement member 55 thus disposed serves not only to increase supporting stiffness of the box member 30 but also to decrease deformation of the side sill 11 and the lower rail 35 in the event of a side impact crash.

Figure 8:
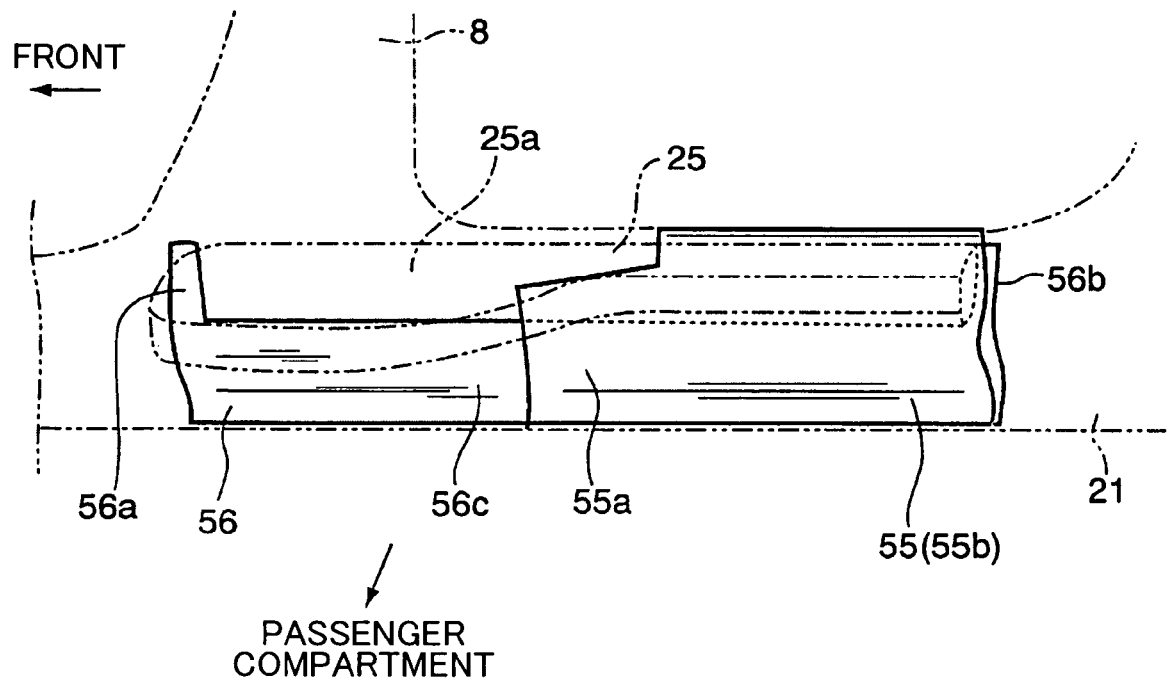
FIG. 8 is an explanatory diagram showing an arrangement of first and second reinforcement members disposed within a side sill as viewed from inside a passenger compartment with a side sill inner plate removed.

FIG. 8 is an explanatory diagram particularly showing an arrangement of the side sill outer plate 21 and the first and second reinforcement members 55, 56 as viewed from inside the passenger compartment. Referring to FIGS. 2 and 8, the first reinforcement member 55 extends along the longitudinal direction of the vehicle body from a point slightly to the front of a mid-length point of the box member 30 to a rear end thereof. A forward portion 55a of the first reinforcement member 55 is shaped as if part of the upper edge thereof is cut off while a rear portion 55b of the first reinforcement member 55 located to the rear of the forward portion 55a has a height large enough to vertically extend along the side sill 11. The forward portion 55a formed by cutting off part of the upper edge of the first reinforcement member 55 is located in an area corresponding to the aforementioned inward-projecting frontal part 30a of the box member 30.

Referring again to FIGS. 2 and 8, the second reinforcement member 56 has a length corresponding generally to the length of the box member 30 along the longitudinal direction of the vehicle body. As is easily recognized from FIG. 4, a longitudinally middle portion 56c of the second reinforcement member 56 has a height approximately half the height of the side sill 11, the middle portion 56c of the second reinforcement member 56 extending downward from approximately a mid-height position of the side sill 11. On the other hand, an upward-projecting forward end portion 56a and an upward-projecting rear end portion 56b of the second reinforcement member 56 each have a height generally equal to the height of the side sill 11, the forward end portion 56a and the rear end portion 56b of the second reinforcement member 56 extending vertically along the side sill 11.

The second reinforcement member 56 thus shaped is spot-welded to the side sill outer plate 21 together with the welding flange 32b formed all along the longitudinal length of the box member 30 (FIGS. 3 and 4). Therefore, the second reinforcement member 56 serves to reduce displacement of the box member 30 toward the passenger compartment in the event of a side impact crash. In addition, since the first closed section 57 formed by the first reinforcement member 55 and the side sill inner plate 20 is reinforced by the second reinforcement member 56 which forms the second and third closed sections 58, 59, it is possible to reduce deformation of the first closed section 57 formed between the first reinforcement member 55 and the side sill inner plate 20. In other words, a closed section formed between the side sill inner plate 20 and the side sill outer plate 21 is divided into the smaller closed sections 57, 58, 59 by the first and second reinforcement members 55, 56, making it possible to enhance the overall stiffness of the side sill 11 in the approximately structure of the embodiment.

The upward-projecting forward and rear end portions 56a, 56b of the second reinforcement member 56 are overlapped with and welded to welding areas at forward ends and rear ends of the upper box member 31 and the lower box member 32, respectively. As a result, the second reinforcement member 56 serves to securely support the box member 30 which is formed of upper and lower halves.

Since at least a portion of the side sill 11 where the second door intrusion reducer 46 is provided is reinforced by the first reinforcement member 55 and the second reinforcement member 56 as discussed above, it is possible to reduce deformation of the side sill 11 and thereby provide an enhanced effect of reducing intrusion of the rear side door 6 into the passenger compartment in the event of a side impact crash. Needless to say, the first and second reinforcement members 55, 56 increase the supporting stiffness of the box member 30 and, thus, serve to provide stable operation of the door slide mechanism for the rear side door 6.

In summary, a side structure of a vehicle of the invention includes a sliding side door for opening and closing a door aperture by sliding along a longitudinal direction of a vehicle body, the sliding side door being provided with a lower roller which is fitted to a lower end portion of the sliding side door in such a way that the lower roller projects laterally toward a passenger compartment, a side sill incorporating a guide rail member for guiding the lower roller along the longitudinal direction of the vehicle body when the sliding side door is slid, the side sill having a door slide opening which is directed laterally outward and extends along the longitudinal direction of the vehicle body, and a engaging member which is fixed to the lower end portion of the sliding side door and extends laterally toward the passenger compartment. In this side structure, the engaging member is located in the door slide opening when the sliding side door is closed, and the engaging member becomes engaged with a peripheral portion of the door slide opening when the sliding side door deforms as a result of a side impact crash.

In the aforementioned vehicle side structure of the invention, the engaging member extending laterally toward the passenger compartment is fixed to the lower end portion of the sliding side door in such a way that the engaging member is located in the door slide opening when the sliding side door is closed and the engaging member becomes engaged with the peripheral portion of the door slide opening when the sliding side door deforms as a result of a side impact crash. With this arrangement, it is possible to reduce intrusion of the sliding side door into the passenger compartment in side impact crashes. The vehicle side structure of the invention is configured such that the engaging member becomes engaged with the door slide opening when the sliding side door deforms due to a side impact crash. The provision of the door slide opening in the side sill incorporating the guide rail member for guiding the sliding side door is commonly known in the basic structure of a vehicle provided with a sliding side door. Therefore, unlike the case of the earlier-mentioned conventional arrangements, it is not necessary to provide the side sill with any dedicated arrangement exposed to the exterior of the vehicle, especially an additional hole for receiving the engaging member in the side sill, for reducing intrusion of the sliding side door into the passenger compartment. This means that the vehicle side structure of the invention capable of reducing side door intrusion into the passenger compartment can be realized without jeopardizing the external appearance of the vehicle.

Typically, the aforementioned engaging member is a pin. The pin preferably has an enlarged head at an extreme end directed laterally toward the passenger compartment. The provision of the enlarged head ensures that the pin engages with the peripheral portion of the door slide opening in a more reliable fashion.

Generally, the side sill of a vehicle provided with a sliding side door incorporates a lower rail. In the vehicle side structure of this invention, the guide rail member incorporated in the side sill includes a lower rail which serves as a strengthening member when the engaging member becomes engaged with the door slide opening as a result of a side impact crash. In the aforementioned conventional arrangement in which a engaging member disposed at a lower end portion of a sliding side door locks into a hole formed in a side sill, it might be necessary to consider the need for an extra reinforcement member for strengthening a portion of the side sill including the hole formed therein. This approach for the conventional arrangement would result in increases in the number of components and vehicle weight. Such problems do not occur in the vehicle side structure of this invention, because the lower rail fixed inside the side sill has a downward-opening U-shaped cross section and, thus, strengthens the side sill.

In one preferable form of the invention, the side sill includes a side sill inner plate and a side sill outer plate which together form a closed section with upper and lower edges of the side sill inner plate joined to upper and lower edges of the side sill outer plate, respectively, and the side structure further includes a first reinforcement member of which upper and lower edges are joined to portions where the upper and lower edges of the side sill inner plate are joined to the upper and lower edges of the side sill outer plate, respectively, so that the first reinforcement member passes generally vertically through the closed section formed in the side sill, dividing the aforementioned closed section, and a box member incorporated in the side sill, the box member having an open end directed toward the door slide opening. In this side structure of the vehicle, a vertical wall portion of the box member located opposite to the open end thereof is joined to the first reinforcement member, and the lower rail is joined to a top plate portion of the box member.

According to this preferable form of the invention, it is possible to further strengthen the side sill since the first reinforcement member passing generally vertically through the closed section of the side sill divides this closed section. Furthermore, since the vertical wall portion of the box member is joined to the first reinforcement member, it is possible to reduce deformation of the lower rail which is joined to the box member in the event of a side impact crash. This serves to provide an enhanced effect of reducing intrusion of the sliding side door caused by side impact crashes.

In another preferable form of the invention, the side structure further includes a second reinforcement member disposed laterally to the outside of the first reinforcement member, further dividing the closed section formed in the side sill. In this side structure of the vehicle, a laterally outside edge of a bottom plate portion of the box member is joined to a lower edge of the door slide opening, and an upper edge of the second reinforcement member is joined to a portion where the laterally outside edge of the bottom plate portion of the box member and the lower edge of the door slide opening are joined to each other, while a lower edge of the second reinforcement member is joined to the portion where the lower edges of the side sill inner plate and the side sill outer plate are joined to each other.

According to this preferable form of the invention, the second reinforcement member can reduce displacement of the box member toward the passenger compartment in the event of a side impact crash and reinforce a closed-section structure formed by the first reinforcement member. Thus, the second reinforcement member serves to reduce deformation of this closed-section structure due to a side impact. This serves to further enhance the aforementioned effect of reducing intrusion of the sliding side door caused by side impact crashes.

In still another preferable form of the invention, the side structure further includes a second engaging member provided on a pillar which is located at the front of the sliding side door. In this side structure of the vehicle, the second engaging member is located in a mating hole formed in a front end of the sliding side door when the sliding side door is closed, the second engaging member becomes engaged with a peripheral portion of the second engaging member when the sliding side door deforms as a result of a side impact crash, and the aforementioned engaging member is fixed at a point located to the rear of the second engaging member and to the rear of a mid-length point of the sliding side door.

According to this preferable form of the invention, it is possible to cause the sliding side door to become engaged with the vehicle body at two points separated along the longitudinal direction of the vehicle body by the engaging member and the second engaging member. This serves to still further enhance the aforementioned effect of reducing intrusion of the sliding side door caused by side impact crashes.

As shown in the foregoing discussion, the side structure of the vehicle of the invention is obtained by using the conventionally known basic structure of the vehicle provided with a sliding side door, in which the side sill has a relatively high level of stiffness by incorporating a guide rail member for guiding the sliding side door when the sliding side door is opened and closed, the side sill having a door slide opening which is directed laterally outward. With the provision of the aforementioned engaging member which becomes engaged with the door slide opening when the sliding side door deforms, it is possible to reduce intrusion of the sliding side door into the passenger compartment in the event of a side impact crash. It is therefore unnecessary to provide the side sill with any dedicated part exposed to the exterior of the vehicle, especially an additional hole in the side sill for receiving the engaging member, for reducing intrusion of the sliding side door into the passenger compartment unlike the case of the earlier-mentioned conventional arrangements.

This application is based on Japanese patent application serial no. 2004-197328, filed in Japan Patent Office on Jul. 2, 2004, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A side structure of a vehicle, comprising:
   a sliding side door for opening and closing a door aperture by sliding along a longitudinal direction of a vehicle body,
   an arm which is fixed to the lower end portion of said sliding door and extends laterally toward the passenger compartment,
   a lower roller which is provided at a distal end of said arm in such a way that the lower roller together with the arm projects laterally toward a passenger compartment;
   a side sill incorporating a guide rail member for guiding the lower roller along the longitudinal direction of the vehicle body when said sliding side door is slid, said side sill having a door slide opening which is directed laterally outward and extends along the longitudinal direction of the vehicle body; and
   an engaging member which is fixed to the lower end portion of said sliding side door and extends laterally toward the passenger compartment, wherein said engaging member is located in said door slide opening when said sliding side door is closed, and said engaging member becomes engaged with a peripheral portion of said door slide opening when said sliding side door deforms as a result of a side impact crash.

2. The side structure of the vehicle according to claim 1, wherein the guide rail member incorporated in said side sill includes a lower rail having a downward-opening U-shaped cross section and extending along the longitudinal direction of the vehicle body.

3. The side structure of the vehicle according to claim 2, wherein said side sill including a side sill inner plate and a side sill outer plate which together form a closed section with upper and lower edges of the side sill inner plate joined to upper and lower edges of the side sill outer plate, respectively, and said side structure further comprising:
   a first reinforcement member of which upper and lower edges are joined to portions where the upper and lower edges of the side sill inner plate are joined to the upper and lower edges of the side sill outer plate, respectively, so that said first reinforcement member passes generally vertically through the closed section formed in said side sill, dividing the closed section; and
   a box member incorporated in said side sill, said box member having an open end directed toward said door slide opening;
   wherein a vertical wall portion of said box member located opposite to the open end thereof is joined to the first reinforcement member, and said lower rail is joined to a top plate portion of said box member.

4. The side structure of the vehicle according to claim 3, further comprising:
- a second reinforcement member disposed laterally to the outside of said first reinforcement member, further dividing the closed section formed in said side sill;
- wherein a laterally outside edge of a bottom plate portion of said box member is joined to a lower edge of said door slide opening; and
- wherein an upper edge of said second reinforcement member is joined to a portion where the laterally outside edge of the bottom plate portion of said box member and the lower edge of said door slide opening are joined to each other, while a lower edge of said second reinforcement member is joined to the portion where the lower edges of the side sill inner plate and the side sill outer plate are joined to each other.

5. The side structure of the vehicle according to claim 1, further comprising:
- a second engaging member provided on a pillar which is located at the front of said sliding side door;
- wherein said second engaging member is located in a mating hole formed in a front end of said sliding side door when said sliding side door is closed, and said second engaging member becomes engaged with a peripheral portion of said mating hole when said sliding side door deforms as a result of a side impact crash, and wherein said engaging member is fixed at a point located to the rear of said second engaging member and to the rear of a mid-length point of said sliding side door.

6. A side structure of a vehicle, comprising:
- a sliding side door for opening and closing a door aperture by sliding along a longitudinal direction of a vehicle body, said sliding side door being provided with a lower roller which is fitted to a lower end portion of said sliding side door in such a way that the lower roller projects laterally toward a passenger compartment;
- a side sill incorporating a guide rail member for guiding the lower roller along the longitudinal direction of the vehicle body when said sliding side door is slid, said side sill having a door slide opening which is directed laterally outward and extends along the longitudinal direction of the vehicle body; and
- an engaging member which is fixed to the lower end portion of said sliding side door and extends laterally toward the passenger compartment, wherein said engaging member is located in said door slide opening when said sliding side door is closed, and said engaging member becomes engaged with a peripheral portion of said door slide opening when said sliding side door deforms as a result of a side impact crash;
- wherein the guide rail member incorporated in said side sill includes a lower rail having a downward-opening U-shaped cross section and extending along the longitudinal direction of the vehicle body; and
- wherein said side sill including a side sill inner plate and a side sill outer plate which together form a closed section with upper and lower edges of the side sill inner plate joined to upper and lower edges of the side sill outer plate, respectively, and said side structure further comprising:
- a first reinforcement member of which upper and lower edges are joined to portions where the upper and lower edges of the side sill inner plate are joined to the upper and lower edges of the side sill outer plate, respectively, so that said first reinforcement member passes generally vertically through the closed section formed in said side sill, dividing the closed section; and
- a box member incorporated in said side sill, said box member having an open end directed toward said door slide opening;
- wherein a vertical wall portion of said box member located opposite to the open end thereof is joined to the first reinforcement member, and said lower rail is joined to a top plate portion of said box member.

7. A side structure of a vehicle, comprising:
- a sliding side door for opening and closing a door aperture by sliding along a longitudinal direction of a vehicle body, said sliding side door being provided with a lower roller which is fitted to a lower end portion of said sliding side door in such a way that the lower roller projects laterally toward a passenger compartment;
- a side sill incorporating a guide rail member for guiding the lower roller along the longitudinal direction of the vehicle body when said sliding side door is slid, said side sill having a door slide opening which is directed laterally outward and extends along the longitudinal direction of the vehicle body; and
- an engaging member which is fixed to the lower end portion of said sliding side door and extends laterally toward the passenger compartment, wherein said engaging member is located in said door slide opening when said sliding side door is closed, and said engaging member becomes engaged with a peripheral portion of said door slide opening when said sliding side door deforms as a result of a side impact crash;
- wherein the guide rail member incorporated in said side sill includes a lower rail having a downward-opening U-shaped cross section and extending along the longitudinal direction of the vehicle body; and
- wherein said side sill including a side sill inner plate and a side sill outer plate which together form a closed section with upper and lower edges of the side sill inner plate joined to upper and lower edges of the side sill outer plate, respectively, and said side structure further comprising:
- a first reinforcement member of which upper and lower edges are joined to portions where the upper and lower edges of the side sill inner plate are joined to the upper and lower edges of the side sill outer plate, respectively, so that said first reinforcement member passes generally vertically through the closed section formed in said side sill, dividing the closed section; and
- a box member incorporated in said side sill, said box member having an open end directed toward said door slide opening;
- wherein a vertical wall portion of said box member located opposite to the open end thereof is provided along the first reinforcement member.

* * * * *